Jan. 1, 1935.  N. RIPPEN  1,986,014
FASTENING MEANS FOR SHEATHING
Filed Nov. 17, 1932

Inventor:
Nicholas Rippen

Patented Jan. 1, 1935

1,986,014

UNITED STATES PATENT OFFICE 1,986,014

FASTENING MEANS FOR SHEATHING

Nicholas Rippen, New York, N. Y.

Application November 17, 1932, Serial No. 643,102

8 Claims. (Cl. 114—84)

My invention relates to sheathing systems wherein parts of the fastening means are welded to the sheathed members, as described in my U. S. A. patent applications, December 15, 1931, Serial Number 581,137, entitled "Wooden sheathing", and April 21, 1932, Serial Number 606,620, entitled "Sheathing system", and particularly to the type shown in Figures 4 and 5 in the latter. To eliminate the need for utilizing the tapered bushing or wedging device in this type as a centering means, and particularly to furnish the bushing with a stronger wedging effect, and incidentally obtain other advantages, certain important and novel changes have been devised in the forms, proportions and relative positions of the various parts, all of which is set forth in the following description, supplemented by the accompanying drawing, in which—

Figure 1:
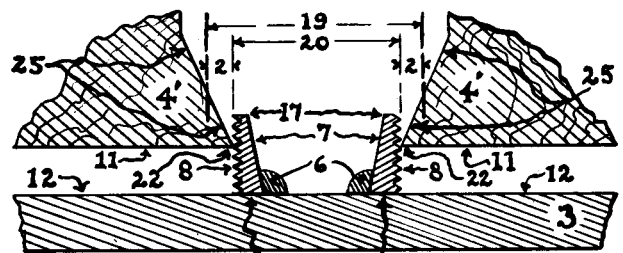
Figure 1 is a partial cross-sectional view of a metal plate or sheathed member and sheathing together with a nipple that forms part of the fastening means welded in place, the sheathing being somewhat spaced from the sheathed member because of distortion in either or both of them, the view being taken in the plane X—X of Figure 3.
Figure 2:
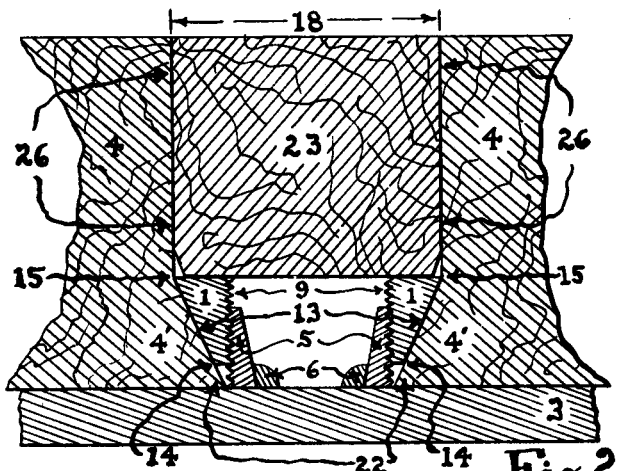
Figure 2 is a more complete view in the same plane, the sheathing and sheathed member drawn together and a plug inserted.
Figure 3:
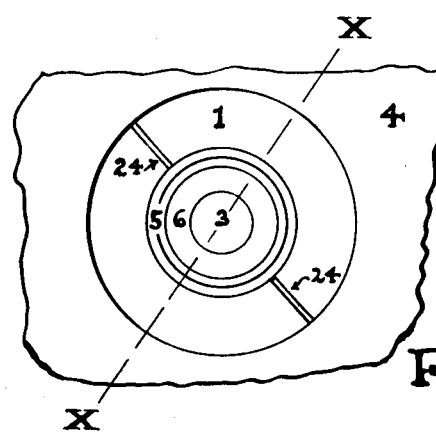
Figure 3 is a plan view of the parts shown in Figure 1.

The words "axes" and "axial" refer to those axes of the fastening means and certain through opening to be described, which are rectangular to the sheathed surface of the sheathed member. The words "inner" and "outer" and corresponding superlatives "innermost" and "outermost" refer to parts and positions respectively adjacent to and spaced from said sheathed member. The adjectives "inside" and "outside" refer to parts and positions respectively regarded centrically and centripetally referring to the said axes. The work "weld" and words generic therefrom are employed in their broadest sense to embrace not only all methods of electric and gas welding with or without the help of added material, but also brazing, soldering and the like. Although the nipple is shown welded by means of a fillet weld, it may be secured by the electric-resistance or similar method.

Referring to the views, sheathed member 3 is sheathed with sheathing 4, 4' secured to the former by fastening means comprising the nipple or threaded member 5 and the tapered bushing 1, the nipple being welded to the sheathed member by the weld 6 deposited adjacent to the innermost end of the nipple, more particularly along the innermost marginal parts of the welding or inside surfaces 7 thereof, said surfaces defining in the nipple a minor through opening that opens to the sheathed surface 12 of the sheathed member, faying with the sheathing surface 11 of the sheathing, said surfaces being referred to also as the minor defining surfaces. The outer and usually bulkier part of the sheathing is indicated by 4 and the inner part thereof, substantially corresponding in thickness and position with the fastening means, is indicated by 4'. A major through opening 18 in the sheathing, whose outer and inner defining surfaces, hereinafter termed major defining surfaces, are indicated by 26 and 25 respectively, extends from the outer to the sheathing surfaces of said sheathing and therefore opens upon the sheathed surface 12, said outer major defining surfaces having the form of a cylinder, although they may also be tapered, and said inner major defining surfaces having the form substantially of a truncated cone whose projected apex is directed toward said sheathed member. The axes of the major opening, the nipple and the bushing coincide with one another, and usually and preferably also with the axis of the minor opening. The outside surfaces 13 of the bushing are tapered correspondingly to and fay with said inner major defining surfaces, thereby effectively wedging inner part 4' of the sheathing against the sheathed member. The innermost end 14 of the bushing is spaced from the sheathed member. The outermost end 15 of the bushing is disposed closer to the outer surface of the sheathing than the outermost end 17 of the nipple, and although this is not an indispensable feature it is preferable for the following reasons. To increase the amount of contact between the nipple and the bushing beyond a certain point is superfluous from a strength-standpoint. The thinner the nipple is, the more accessible its innermost parts are for welding. On the other hand, if the wedged, inner part 4' of the sheathing is no thicker than the fastening means shown, the retaining force acting on the sheathing would not be great enough; said inner part 4' and the related bushing are therefore made thicker. The helically threaded outside surface 8 of the nipple cooperates with the correspondingly threaded inside surface 9 of the bushing, the latter screwing over on to the nipple and substantially occupying the space 2 obtaining between the nipple and the inner major defining surfaces, the mean diameter of the latter being indicated by 19, the outside diameter of the nipple, which is identical with the minimum diameter of the major defining surfaces and particularly the inner major defining surfaces, is indicated by 20, said minimum diameter being taken across between the innermost marginal portions 22 of the sheathing at the innermost end of the major opening. Consequently when the nipple is inserted for welding to the sheathed member, the nipple bears against said portions 22 all around, thus assuring automatically obtained concentric position for the nipple with reference to the axis of said major opening. The bushing is provided with two slots 24 in its outermost end for cooperation with a suitable tool for screwing said bushing tightly into place after the nipple has been welded, subsequently to which the plug 23, coated with white lead is driven in with a maul, if the application demands any plug at all. Since the nipple touches only a very thin edge of the sheathing (at 22), any charring effect on the latter resulting from the heat of welding can be only nominal; the greater part of the inner major defining surfaces being spaced from the nipple, any considerable charring thereof is impossible.

In applying the system, it is advisable to screw each bushing immediately after the welding of the related nipple so as to reduce the amount of separation between sheathing and sheathed member at adjoining welding positions. In rare instances of excessive separation, temporary shoring or weighting at the critical points overcome the difficulty.

I claim:

1. The combination of a sheathed member, sheathing thereon having a major through opening whose major defining surfaces extend from the outer to the sheathing surfaces of said sheathing, and fastening means securing said sheathing to said sheathed member and comprising a nipple and a tapered bushing, said nipple having a minor through opening whose minor defining surfaces open upon the sheathed surface of said sheathed member, to which the nipple is secured at the innermost end thereof by means of a weld, said bushing having outside surfaces forming substantially a truncated cone whose projected apex is directed toward said sheathed member, the inner parts of said major defining surfaces being correspondingly tapered, faying with and being wedged by said outside surfaces, the inside surfaces of said bushing being helically threaded, the outside surfaces of said nipple being correspondingly threaded, said bushing screwing over on to said nipple, the mean diameter of said major opening at the said inner parts thereof exceeding the maximum diameter of said nipple, the latter being substantially equal to the minimum diameter of said major opening.

2. The combination set forth in claim 1, the outermost end of said bushing extending further toward the outer surface of said sheathing than the outermost end of said nipple.

3. The combination set forth in claim 1, the innermost end of said bushing being spaced from said sheathed surface.

4. The combination set forth in claim 1, the outermost end of said bushing extending further toward the outer surface of said sheathing than the outermost end of said nipple, and the innermost end of said bushing being spaced from said sheathed surface.

5. The combination of a sheathed member, sheathing thereon having a major through opening whose major defining surfaces extend from the outer to the sheathing surfaces of said sheathing, and fastening means securing said sheathing to said sheathed member and comprising a nipple and a tapered bushing, said nipple having a minor through opening whose minor defining surfaces open upon the sheathed surface of said sheathed member, to which the nipple is secured by means of a weld deposited interiorly thereof, said bushing having outside surfaces forming substantially a truncatd cone whose projected apex is directed toward said sheathed member, the inner parts of said major defining surfaces being correspondingly tapered, faying with and being wedged by said outside surfaces, the inside surfaces of said bushing being helically threaded, the outside surfaces of said nipple being correspondingly threaded, said bushing screwing over on to said nipple, the mean diameter of said major opening at the said inner parts thereof exceeding the maximum diameter of said nipple, the latter being substantially equal to the minimum diameter of said major opening.

6. The combination set forth in claim 5, the outermost end of said bushing extending further toward the outer surface of said sheathing than the outermost end of said nipple.

7. The combination set forth in claim 5, the innermost end of said bushing being spaced from said sheathed surface.

8. The combination set forth in claim 5, the outermost end of said bushing extending further toward the outer surface of said sheathing than the outermost end of said nipple, and the innermost end of said bushing being spaced from said sheathed surface.

NICHOLAS RIPPEN.